March 23, 1954     L. H. STAUFFER     2,673,326
APPARATUS AND METHOD FOR TESTING MAGNETIC MATERIAL
Filed Nov. 12, 1952
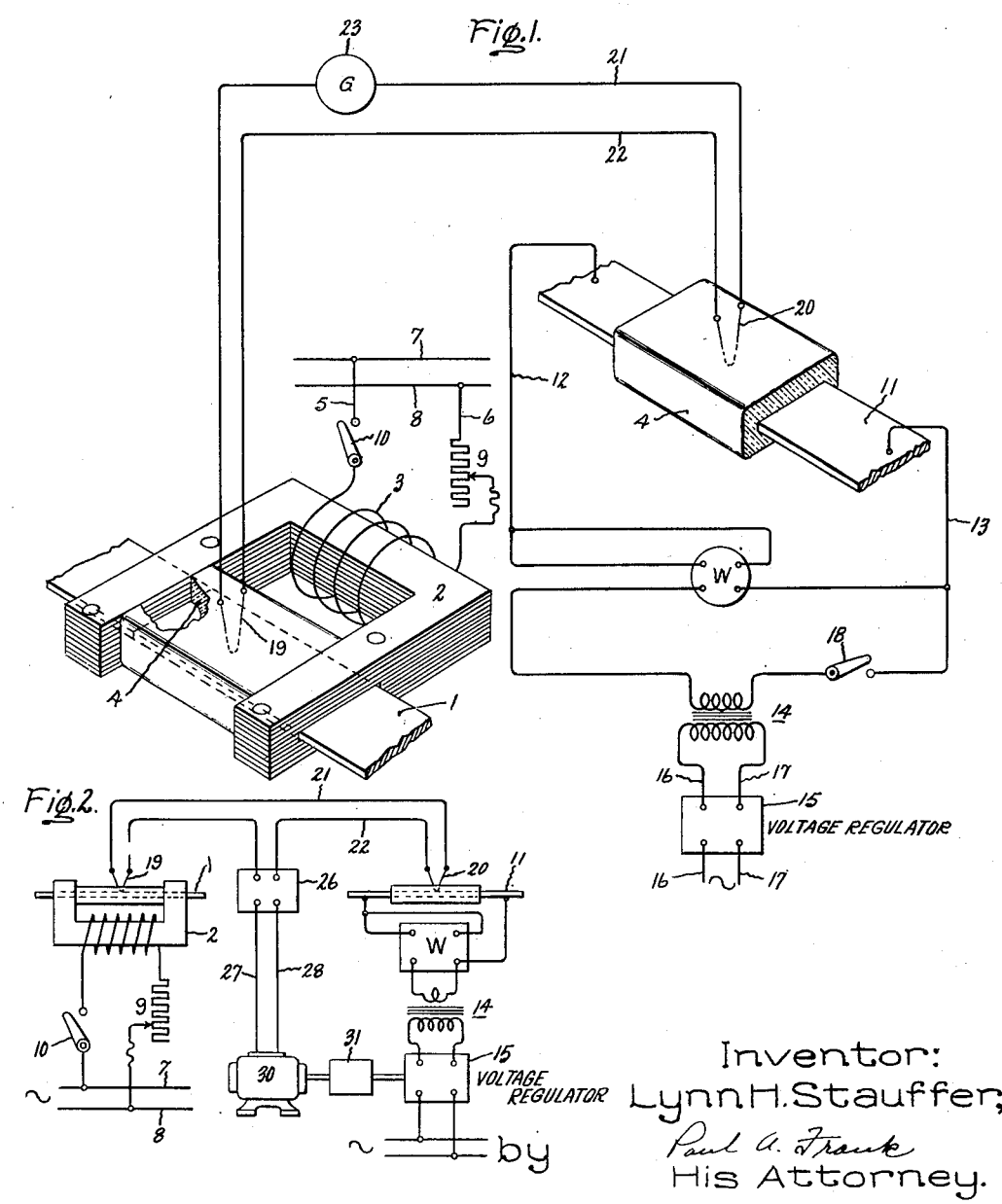
Inventor:
Lynn H. Stauffer,
by Paul A. Frank
His Attorney.

Patented Mar. 23, 1954

2,673,326

UNITED STATES PATENT OFFICE 2,673,326

APPARATUS AND METHOD FOR TESTING MAGNETIC MATERIAL

Lynn H. Stauffer, Lakewood, Ohio, assignor to General Electric Company, a corporation of New York Application November 12, 1952, Serial No. 320,039

3 Claims. (Cl. 324—32)

The present invention relates to apparatus for the determination of energy losses in magnetic material, as for example, magnetic sheet steel, which is intended to be built as laminations into core structures in electrical apparatus.

The object of my invention is to provide fast and convenient determination of magnetic properties of magnet material and particularly to determine in advance the hysteresis and eddy current losses which will occur during normal operation in electrical devices containing such material, for example, as core structures when traversed by a time-varying magnetic field. The selection of magnetic material with a knowledge of its magnetic properties makes possible the production of electric apparatus of improved and efficient operation.

Conventional processes for measuring physical properties of magnetic stock have been laborious and time-consuming and have involved the mutilation of such stock because of the cutting of test samples therefrom, which lessened or destroyed the usefulness of the stock from which samples were taken.

Direct measurement of energy losses in a sample of magnetic material in which a magnetic flux is being induced would require (a) measurement of time during which excitation is applied, (b) knowledge of specific heat of the specimen and (c) complete elimination, or correction for, thermal losses. As in the practice of my invention these factors can be made equal in a test specimen and a comparison specimen, they balance out and thus eliminate cumbersome and time-consuming observations and calculations. No temperature measurement is required as in a direct method. Only the change in a wattmeter indication need be recorded. Since the final result depends only on the difference between the initial and final wattmeter readings, zeroing errors are eliminated.

In my prior application for U. S. Letters Patent, Serial No. 278,552, filed by me on March 26, 1952, and assigned to the same assignee as the present application, I have described a method and apparatus for measuring the magnetic properties of a specimen of magnetic sheet material by a measurement of voltage induced by a magnetic flux between points spaced apart on the surface of a specimen of sheet metal, the measured voltage serving as an indication of flux density in the specimen. By combining such observation with observation of another voltage derived from the specimen which is proportional to the time rate of change of magnetic field intensity the power loss in a defined portion of the specimen may be determined.

In accordance with my present invention, power losses may be observed more directly and easily in a given specimen of magnetic material by an apparatus and method involving comparison of the rate of temperature rise in a specimen in which energy losses are to be determined (which may be referred to as an unknown strip) with the rate of temperature rise of another similar specimen of magnetic material (which may be referred to as a comparison strip) in which a comparable rate of temperature rise is produced by readily measurable electric energy consumption. My invention will be described in greater detail in the following specification and defined in the appended claims.

The accompanying drawing shows in Fig. 1 conventionally an apparatus for carrying out my invention; Fig. 2 illustrates a modification whereby the temperatures of the unknown and comparison strips may automatically be adjusted.

Fig. 1 shows a specimen 1 of sheet material which may be assumed to consist of silicon steel, and is chosen as representative of a lot of sheet steel having unknown magnetic characteristics. The specimen 1 (the unknown strip) is heated by being brought into inductive relation to a magnetic core 2 which is provided with an electrical winding 3. Heat insulating spacers 4 are provided on both sides of the specimen 1 to insure against undue loss of heat. A part of the top heat insulator has been shown broken away. The primary winding 3 is supplied by the conductors 5, 6, leading from a source of alternating current (preferably regulatable), represented conventionally by the mains 7, 8. An adjustable rheostat 9 is included in the circuit to adjust the degree of magnetization of the sample. A switch 10 is provided in the conductor 5 to close and open the circuit.

A specimen 11 of similar material, having similar heat capacity (the comparison strip), is provided and arranged to be heated by direct passage of current supplied by the conductors 12, 13 (suitably connected thereto), from a suitable source as, for example, the low voltage secondary winding of a transformer 14. A regulatable auto-transformer or induction regulator 15 is included in the primary circuit 16, 17, of the transformer 14. A switch 18 is provided in the secondary circuit of the transformer 14.

In thermal contact with the specimen 1, the unknown, is a sensitive thermocouple or thermopile 19. A second thermocouple or thermopile 20 is provided which is in good thermal contact with the comparison specimen 11. The thermocouples 19 and 20 are connected in opposition by the circuits 21, 22 in series with a suitable sensitive voltage-responsive device 23, for example, a galvanometer.

Assuming the specimen 1 to be traversed by magnetic flux excited therein by the electromagnet 2 when its winding 3 is supplied with alternating current, the temperature of the specimen 1 will rise due to heating by hysteresis and eddy currents. The temperature at first will increase linearly with time and as the heat losses by conduction, convection and radiation increase, the rate of temperature rise will slowly decrease until finally a constant temperature will be reached. The initial linear rate of the temperature rise in proportional to the power loss in the specimen and is small in modern improved core materials, hence it is required to accurately compare small rates of temperature change. A similar initial rise of temperature is produced in the comparison specimen 11 by power losses ($I^2R$) due to the conversion of known power into heat due to its resistance.

As the two thermocouples are connected in voltage opposition any differences in temperature will result in a deflection of the galvanometer 23. The current in the supply circuit 12, 13, should be so adjusted that the galvanometer shows no resultant change in its deflection over a short time interval, indicating that the rates of temperature rise in the specimens 1 and 11 are equal. The watt loss per unit weight of the two metal specimens then will be equal, that is, when this balance of temperature rates is reached. The energy consumption per pound or other unit of weight in the comparison specimen may be computed from its known power consumption as indicated by wattmeter 24 which is connected in the circuit 12, 13. The energy loss per unit weight in the unknown specimen 1 will be the same as that of the comparison specimen.

Since the initial temperatures of 1 and 11 may be changing at slightly different rates due to unequal rates of heat loss or gain to or from their surroundings, a drift of the galvanometer indication may be observed, even though specimen 1 carries no alternating magnetic flux. Such an initial drift may be eliminated by heating or cooling specimen 11 at such a rate that its temperature drift matches that of specimen 1. This can be accomplished by varying the voltage applied to the transformer 14 until no initial drift appears. Any desired rate of rise of the temperature of specimen 11 may be produced by adjusting the regulator 15 in the supply circuit 16, 17, of the transformer 14. Likewise, any desired rate of cooling may be produced by first heating 11 above the temperature of its surroundings and then reducing the power input by a suitable amount. Thus the initial reading of galvanometer 23 may be made stationary by applying power to specimen 1 or 11 as required by operating the switches 10 and 18 to vary the relative intervals of heating and by operation of the regulator 15, provided that precautions are taken to thermally shield 1 and 11.

If after bringing galvanometer 23 to an initial stationary indication, the strip 1 is electromagnetically excited by passing current through the coil 3, the temperature of the strip 1 will rise, producing a linear rate of deflection in the galvanometer 23. A uniform drift of indication on 23 may be nullified by increasing the heat input ($I^2R$) to strip 11 until its rate of temperature rise equals that of 1. This condition will be indicated by a constant stationary indication on galvanometer 23 for a short time. If the specific heats of 1 and 11 are equal, the above described balance indicates equal rates of energy conversion per unit weight, in both strips. The observed increase in power input to 11, above that required for the initial balance, divided by the weight of 11 will be a measure of the power loss per unit weight in specimen 1.

A linear rate of temperature rise will exist in both specimens for only a short time, usually less than one minute; depending on the quality of the thermal insulation. Linear rate of rise can exist only when no heat is lost by specimen to surroundings. The heat losses increase as temperature rises. Therefore, measurements should be made while the temperature rise is small. After excitation is applied it is desirable to provide for rapid adjustment of the voltage applied to the source 14 and to interrupt the excitation of 1 and 11 as soon as a balance is obtained. A series of successive measurements may be made, provided that the necessary initial balance is made before excitation is again applied.

It is obvious that precautions, well known to those skilled in the art of temperature measurement, must be taken to provide good thermal contact between the thermal junctions 19 and 20 and specimens 1 and 11, respectively. This may include welding, soldering, cementing, or the use of a fluid which wets the contact point between the respective thermocouples and the heated surfaces. Specially constructed thermal junctions of thin metal ribbon may be used and pressure may be applied to maintain good thermal contact. In any case the heat capacity of the thermal junction should be small compared to that of the element of magnetic material beneath it.

As the galvanometer deflection is influenced only by heat gained or lost by the portion of the specimens near the thermal junctions, it is important to protect these portions from stray heat losses or gains. The thermal junctions and their leads must be small so as to have low heat capacity. Also, the legs of the magnetizing core 2 must be long enough and far enough apart to minimize heat transfer from the magnetizing core and coil. Both thermal junctions should be alike in thermal capacity and conductivity so that errors due to thermal losses to them will tend to compensate each other. Heat transfer by conduction along the specimen strips may be minimized by increasing their length, thus reducing temperature gradients in them.

Since specimens 1 and 11 need not be of the same size, the strip 11 may be made larger than strip 1 so as to consume large enough amount of power to be readily measured by a low range wattmeter, for example, a wattmeter of the light beam type. Power losses as low as 1 watt per pound must be measured by the wattmeter and therefore it must be of a sensitive type.

Automatic balancing devices may be employed and the wattmeter readings may be recorded automatically as, for example, on a strip chart of a recording wattmeter. Thus an unbalance potential applied at 23, when specimen 1 is excited, may be amplified and made to control the power input to 11 so as to automatically balance the device. Such an automatic self-balancing circuit is illustrated schematically in Fig. 2 which shows a device 26 for automatic balancing substituted for the galvanometer 23, the output circuit 27, 28 being connected to a motor 30 which through suitable gearing 31 regulates the induction regulator 15. The device 26, for example, may be a sensitive multistage D.-C. amplifier which raises the power level of the unbalance voltage from the thermocouples to drive a D.-C. motor in a direction depending on the polarity of the unbalance voltage. This motor then operates the induction regulator rotor until the circuit is balanced.

In an alternative self-balancing arrangement the device 26 is a known type of self-balancing photoelectric potentiometer. The output of this device when suitably amplified may be made to operate and drive the motor on the induction regulator.

What I claim and desire to secure by Letters Patent of the United States is:

1. An apparatus for determining the power loss characteristics of a magnetizable material which consists in means for inducing therein an alternating magnetic field at a steadily maintained value which is sufficiently great to cause rise of temperature in said material, means for heating a second similar object by passage of current therethrough, means for indicating the attainment of stable equality of rates of temperature rise in said objects and means for measuring the electric energy required to maintain said second object at the equal rate of temperature rise.

2. An apparatus for determining characteristic of a specimen of magnetic material which consists in the combination of a U-shaped magnetic core, the ends of which are adapted to be coupled magnetically with a specimen to be tested, means for heating a comparison specimen by conduction of current therethrough, means for heat-insulating both of said specimen, thermocouples respectively in close thermal relation to said specimen, means for balancing the rate of rise of the temperatures of said respective specimen, and means for measuring the energy input required to heat said second object to a temperature at which balance occurs.

3. An apparatus for determining magnetic characteristic of a test specimen of sheet material which consists in the combination of means for inducing an alternating magnetic flux in said specimen of sufficient power to heat said specimen, a similar comparison specimen, means for heating said comparison specimen by passage of current therethrough, thermo-electric devices respectively in close thermal relation with said specimen, a circuit connecting said thermoelectric devices in opposition to one another, and means actuated in response to an unbalance of voltages of said thermo-electric devices for varying the power input to said comparison specimen to automatically arrive at a balance of energy consumption in said test and comparison specimen, whereby the power consumed in said test specimen may be determined.

LYNN H. STAUFFER.

References Cited in the file of this patent
UNITED STATES PATENTS

| Number | Name | Date |
|---|---|---|
| 939,109 | Switzer | Nov. 2, 1909 |
| 2,264,968 | De Forest | Dec. 2, 1941 |